March 31, 1959 P. KUCERA 2,879,628
GLASS SHAPING APPARATUS
Original Filed Jan. 9, 1951 9 Sheets-Sheet 1

INVENTOR.
PETER KUCERA.
BY Archworth Martin
his ATTORNEY.

March 31, 1959 P. KUCERA 2,879,628
GLASS SHAPING APPARATUS
Original Filed Jan. 9, 1951 9 Sheets-Sheet 3

INVENTOR.
PETER KUCERA.
BY Archworth Martin
his ATTORNEY.

March 31, 1959 P. KUCERA 2,879,628
GLASS SHAPING APPARATUS
Original Filed Jan. 9, 1951 9 Sheets-Sheet 4

INVENTOR.
PETER KUCERA.
BY Archworth Martin
his ATTORNEY.

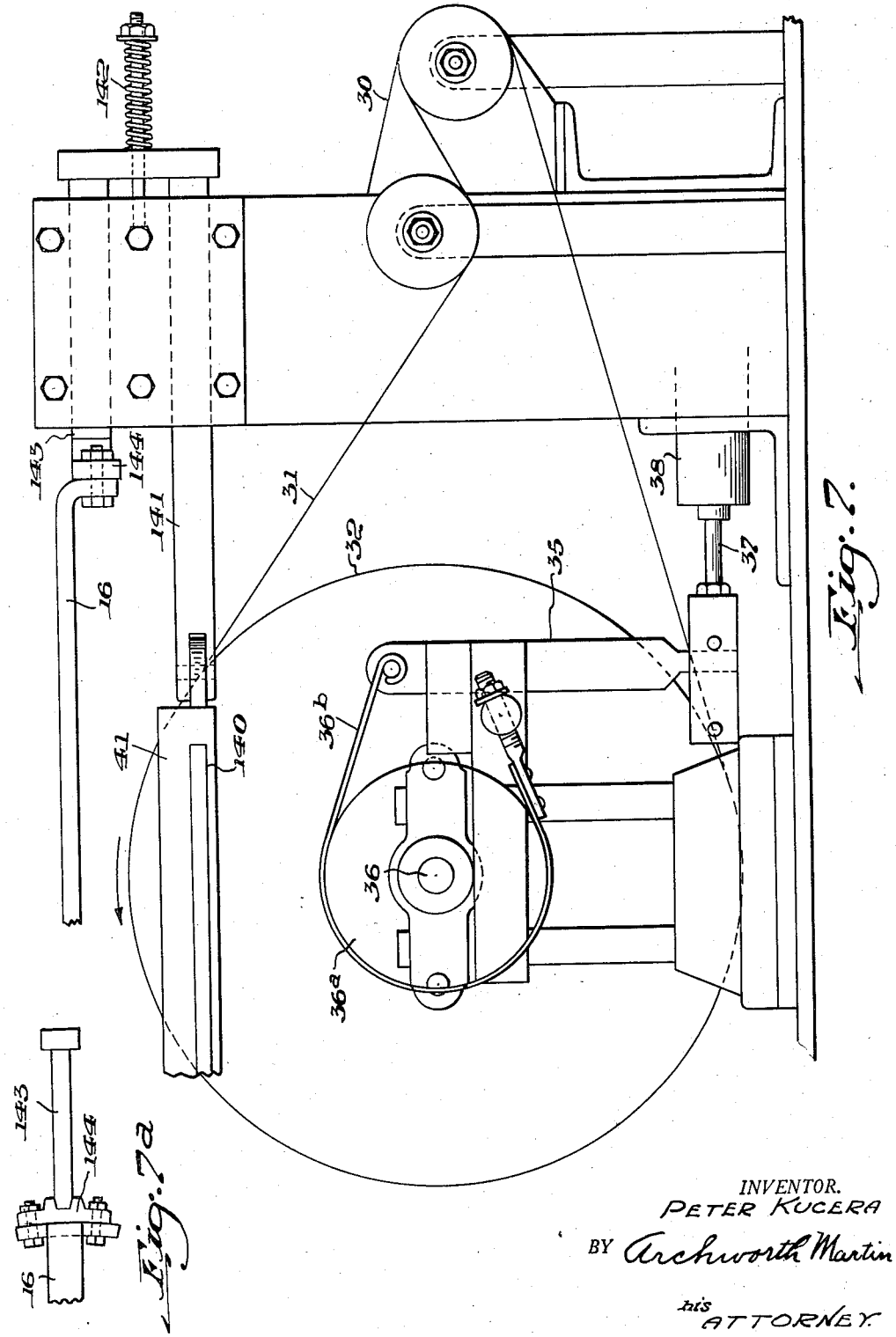

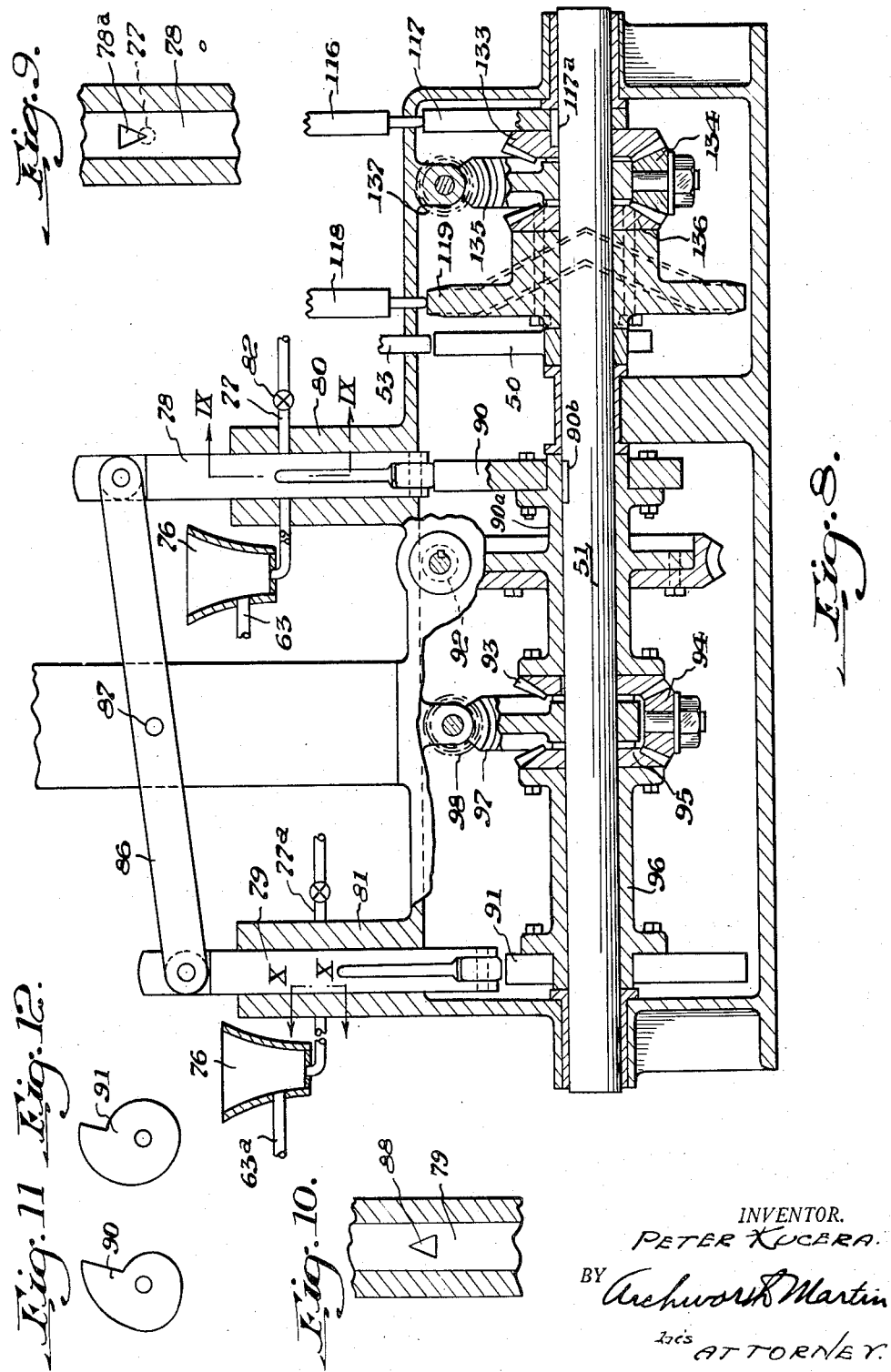

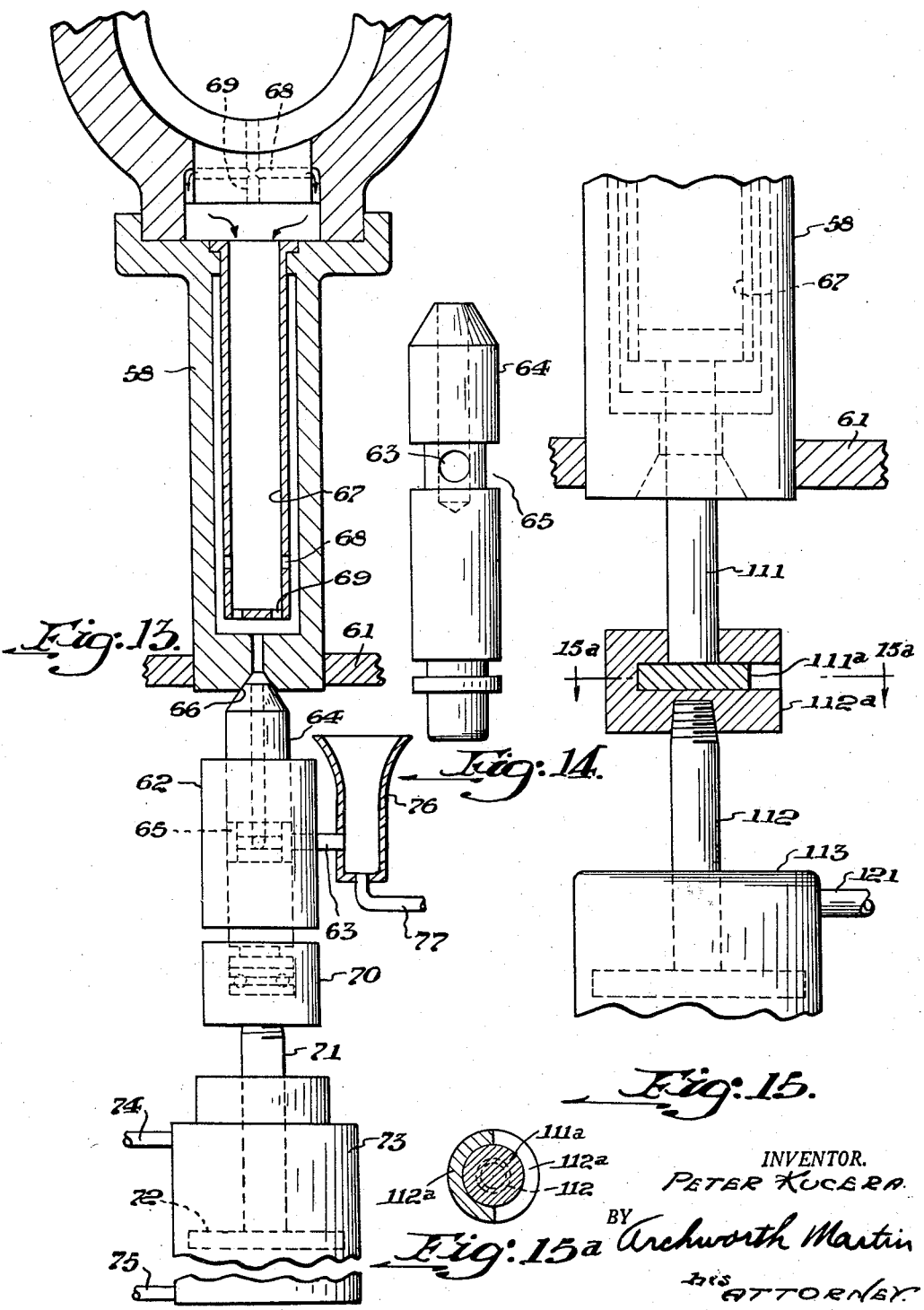

March 31, 1959 P. KUCERA 2,879,628
GLASS SHAPING APPARATUS
Original Filed Jan. 9, 1951 9 Sheets-Sheet 8
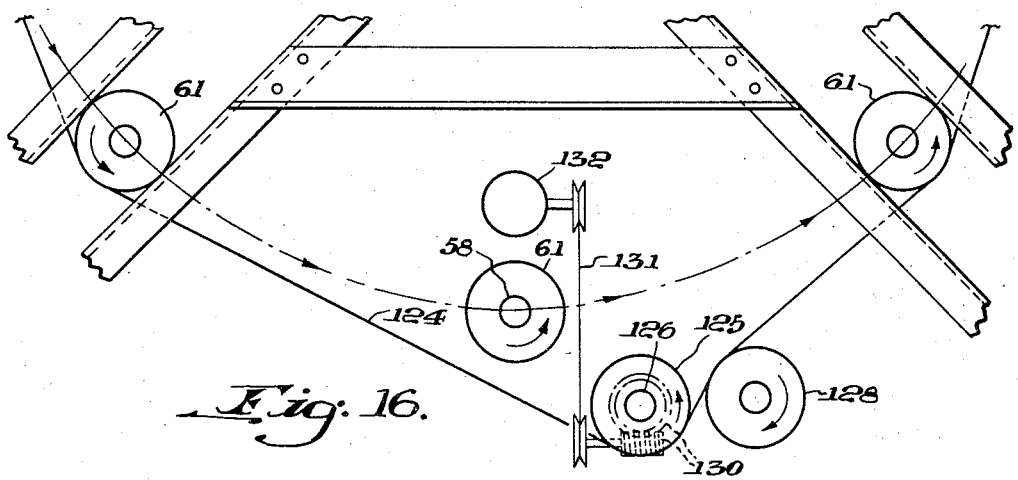
Fig. 16.
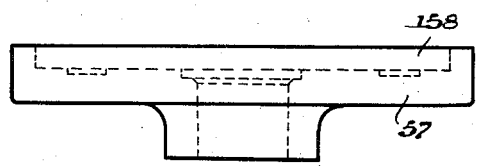
Fig. 17.
Fig. 18.
Fig. 19.
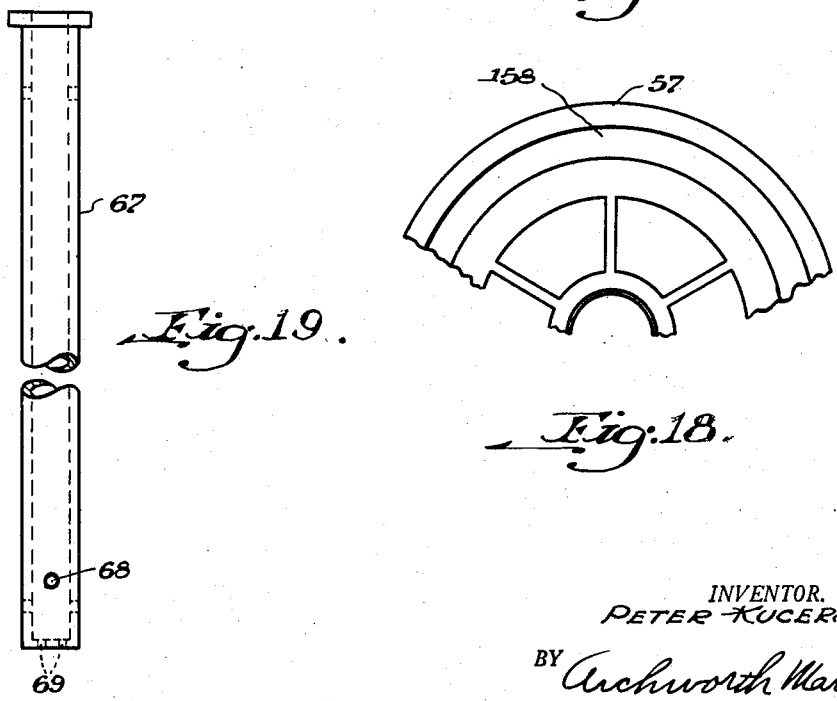
INVENTOR.
PETER KUCERA.
BY Archworth Martin
his ATTORNEY.

March 31, 1959     P. KUCERA     2,879,628
GLASS SHAPING APPARATUS
Original Filed Jan. 9, 1951     9 Sheets-Sheet 9
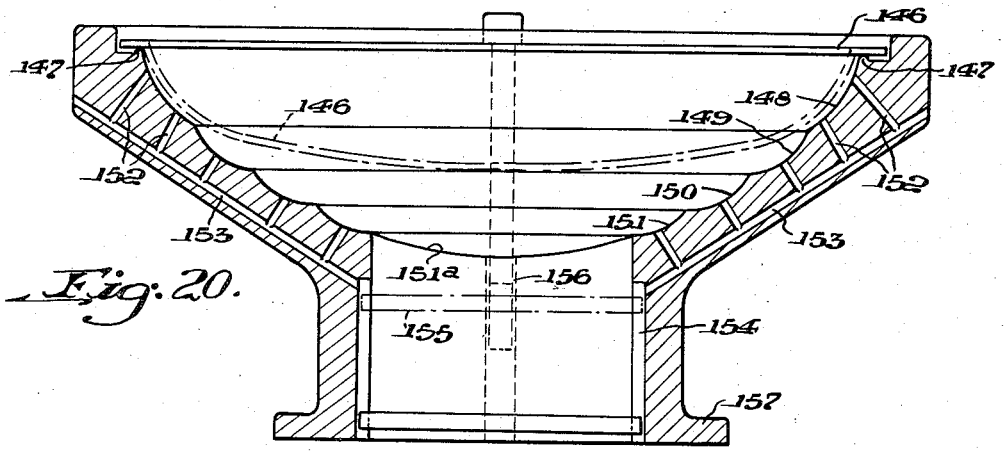
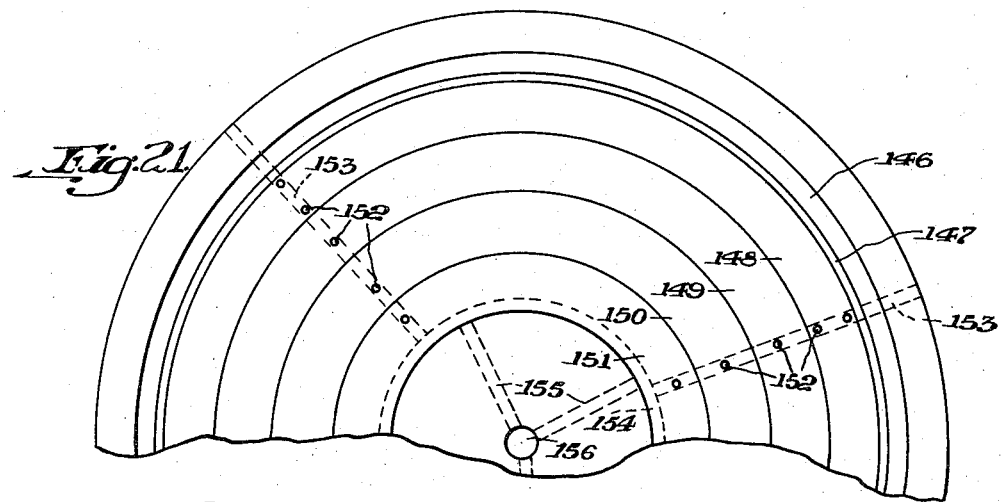
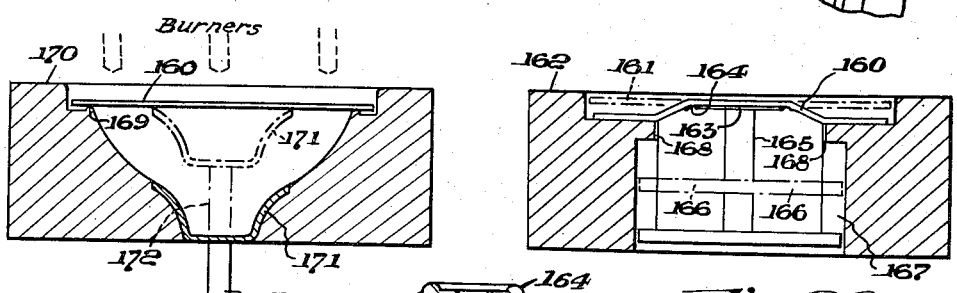
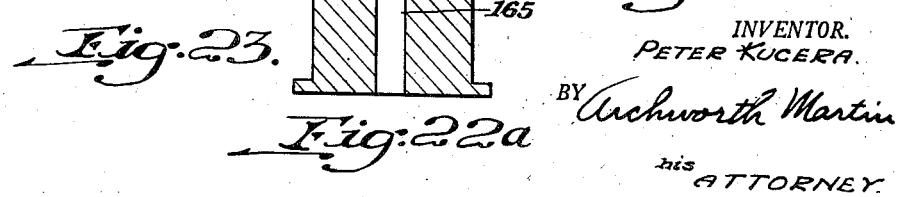
INVENTOR.
PETER KUCERA.
BY Archworth Martin
his ATTORNEY.

United States Patent Office 2,879,628
Patented Mar. 31, 1959

2,879,628

GLASS SHAPING APPARATUS

Peter Kucera, Pittsburgh, Pa.

Original application January 9, 1951, Serial No. 205,191. Divided and this application April 6, 1956, Serial No. 576,699

3 Claims. (Cl. 49—1)

This invention relates to the shaping of glassware, and more particularly to apparatus for changing the shape of a previously-formed glass article or blank, to a desired contour. This application is a division of my application Serial No. 205,191, filed January 9, 1951 (now abandoned). As described herein, flat glass plates are heated to a softened condition and then given the desired shape in a mold or former, by the use of pneumatic pressure or suction.

While the invention is herein described as being employed in the shaping of glassware from glass plates, it will be understood that the apparatus can be used also in shaping other forms of blanks and other thermoplastic materials.

One object of my invention is to provide apparatus for so applying and controlling suctional forces as to facilitate and improve upon the shaping of glass blanks to desired forms, as compared to prior devices and mechanisms.

Another object of my invention is to provide an improved arrangement of heating furnace and operating mechanism for moving the work pieces therethrough.

Still another object of my invention is to provide an improved mechanism for the operation of bending glassware to desired contours and simultaneously controlling the thickness in various portions of the completed article.

In the accompanying drawings,

Fig. 7 is an enlarged side elevational view of a portion of the apparatus of Fig. 6;

Fig. 7a is a plan view of the latch device of Fig. 7;

Fig. 8 shows mechanism for operating the suctional devices and the ejecting devices that respectively assist in the shaping of the article and the ejection thereof from the formers;

Fig. 9 is an enlarged sectional view of one of the suction controlling valves of Fig. 8 on the line IX—IX thereof;

Fig. 10 is a similar view showing the other suction controlling valve;

Fig. 11 is a face view of the cam for operating one of the valves in Fig. 8;

Fig. 12 is a face view of the cam for operating the other valve;

Fig. 13 is an enlarged view showing the means by which the work pieces in the former are subjected to suctional forces;

Fig. 14 is a still further enlarged view of the valve of Fig. 13;

Fig. 15 is an enlarged view showing one of the lifting devices for raising an article out of the shaper or mold;

Fig. 15a is a sectional plan view of the slotted head of Fig. 15;

Fig. 16 is a fragmentary plan view showing the manner in which the formers or molds are rotated on their individual axes;

Figs. 17 and 18 are elevational and plan views of one of the adapters for supporting the molds;

Fig. 19 is a view of the sleeve used in conducting air from the molds under suction and for raising the ware;

Fig. 20 is a sectional view through a mold, suitable for use with my apparatus;

Fig. 21 is a partial plan view thereof;

Fig. 22a is a vertical sectional view through a portion of the structure of Fig. 22, and Figs. 22 and 23 are respectively illustrative of other forms of molds.

Figure 1:
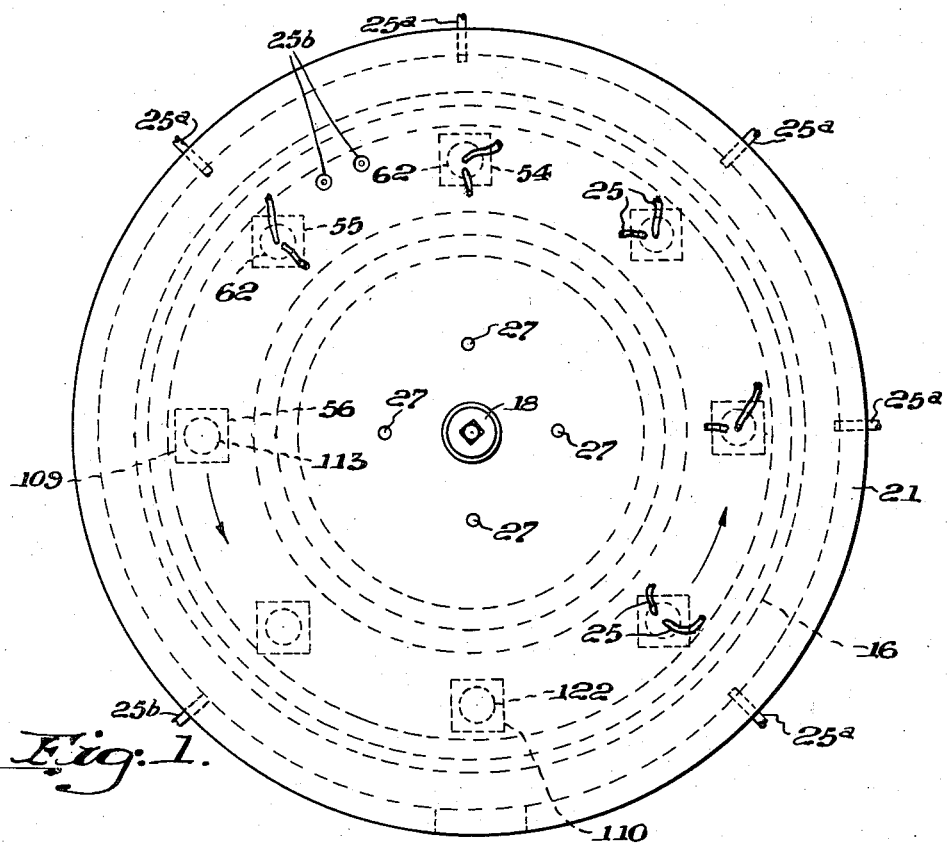
Figure 1 is a plan view of a furnace which I employ, showing the disposition or arrangement of the fuel-supply lines and burners.

The machine has a base 14 and a supporting pedestal 15 and comprises a table 16 rotatably supported thereon through anti-friction bearings 17. The pedestal 15 surrounds a stationary column 18 that supports the central portion of the furnace, the peripheral portions thereof being supported by posts 19 of channel form. The posts 19 carry horizontal metal framework members 20 that, in turn, support the arch or roof blocks 21 through hanger bolts 22. The radial frame members 20 are connected by cross bars 23 through which the hanger bolts 22 extend. Slots or spaces 24 are provided in the frame and between the bricks 21, for the introduction of burner nozzles 25 for heating the ware somewhat directly, as hereinafter explained. Side burners 25a are also provided, for more particularly heating the furnace chamber as a whole.

The furnace bricks are so arranged as to form a circular chamber 26 wherein the ware is heated. Exhaust vents 27 are provided to carry away the waste gases.

Figure 3:
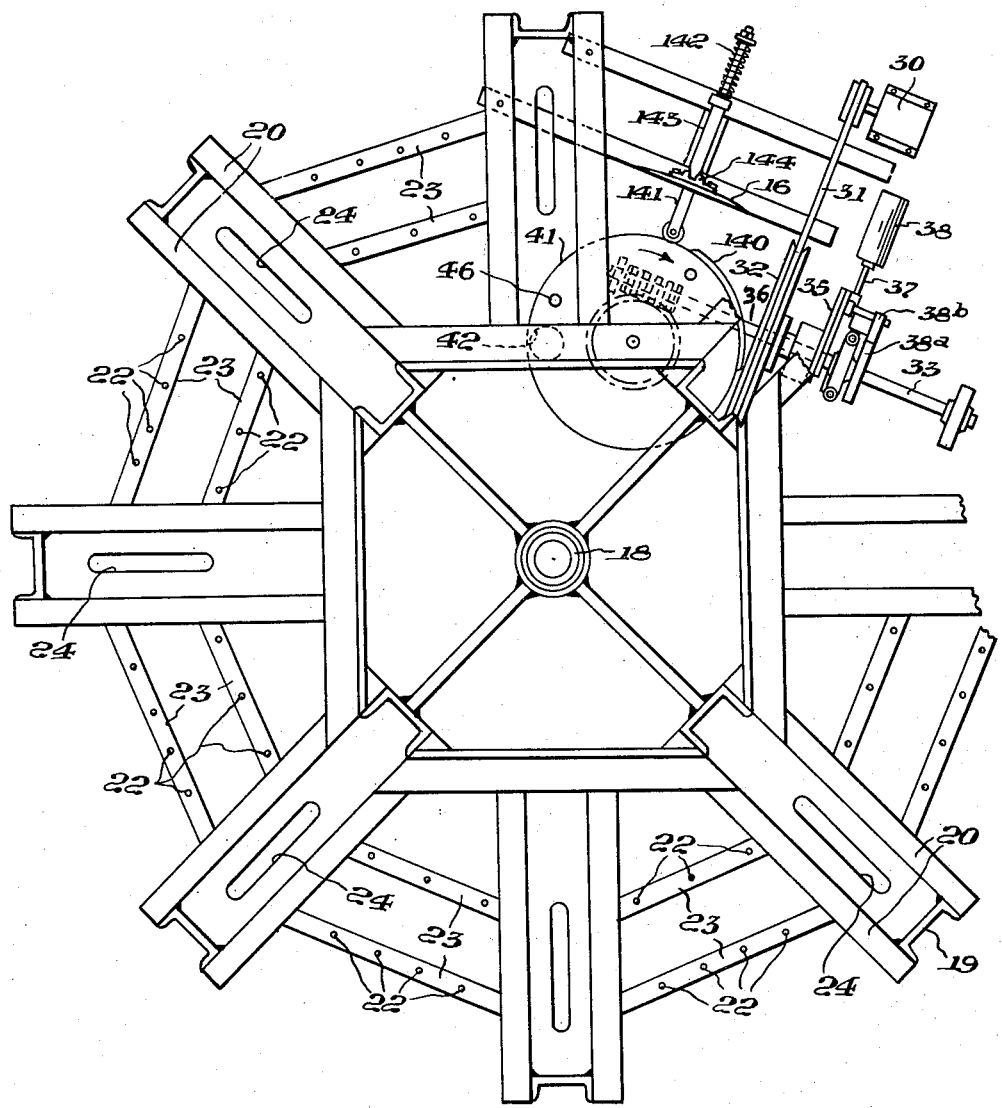
Fig. 3 is a plan view of the stationary furnace framework of Figs. 2 and 4, together with certain of the driving mechanism.
Figure 4:
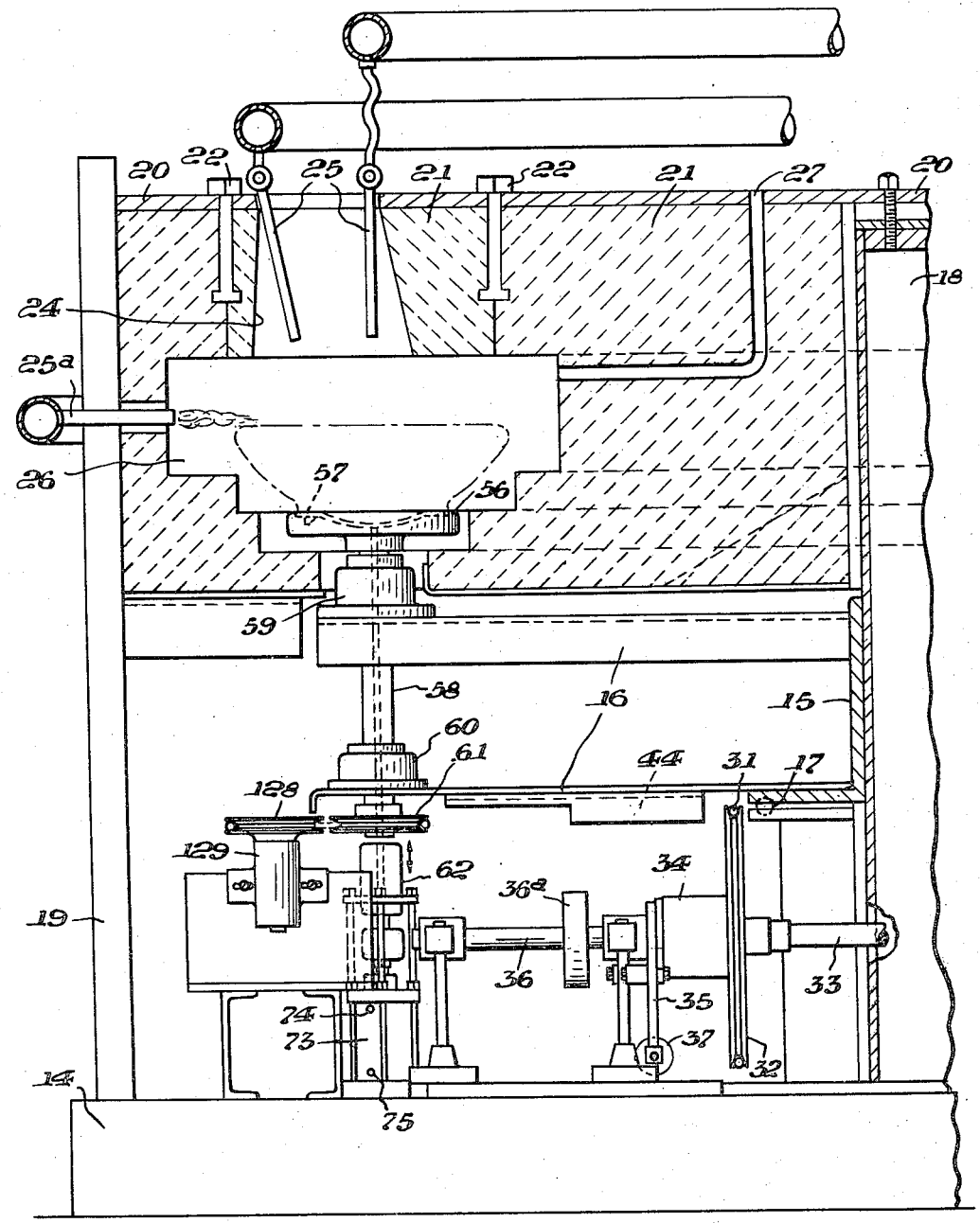
Fig. 4 is an enlarged vertical sectional view through a portion of the structure of Fig. 2 on the line IV—IV, but including the driving mechanisms in the lower part of the machine.
Figures 5, 6:
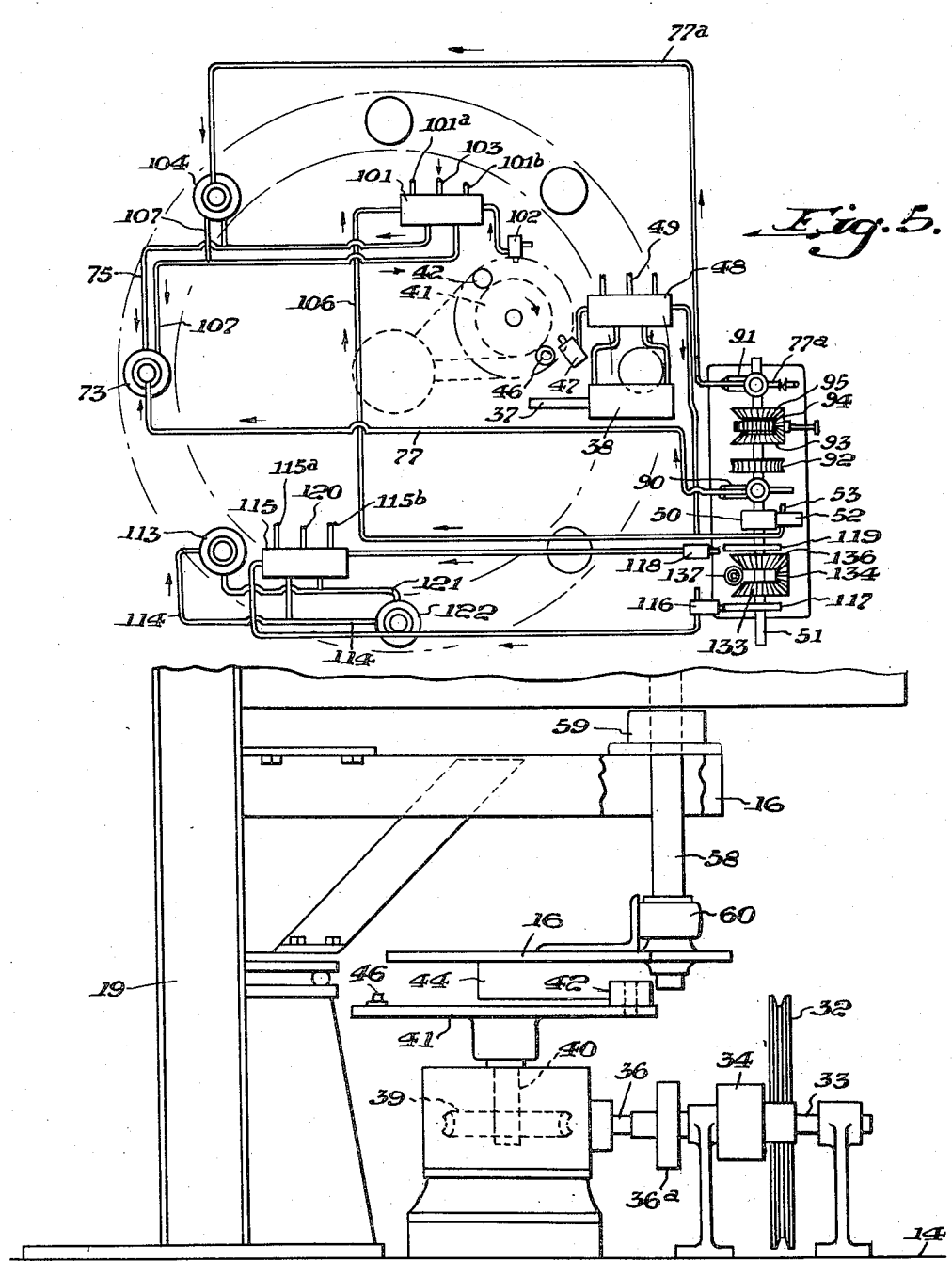
Fig. 5 is a schematic plan view of the control devices for automatically operating various parts of the apparatus.
Fig. 6 is an elevational view of a portion of the mechanism of Fig. 4.

The table is driven by a motor 30 (Figs. 3–4) through a belt 31 that drives a pulley 32. The pulley 32 is carried by a shaft 33 which, through a clutch 34 that is engaged and disengaged by a clutch lever 35, drives a worm shaft 36. The clutch lever 35 is operated in both directions by a piston rod 37 connected with a piston in a cylinder 38. The clutch drives a worm on the shaft 36, that meshes with a worm gear 39, which, in turn, rotates a shaft 40 that carries a disc 41 (Fig. 6). The disc carries a roller 42 that engages successively in eight Geneva slots 44 on the underside of the table 16, so that each time the shaft 40 makes a revolution, the table is moved one step.

At the completion of an advancing movement of the table, the clutch lever 35 is automatically operated to temporarily disconnect the Geneva drive. Disconnection of the clutch is effected by a pin 46 (Figs. 3 and 5) on the crank disc 41. This pin trips a valve 47 that admits pressure to one end of a control valve 48 to thereby direct fluid pressure from a supply line 49 to one end of the clutch-operating cylinder 38. To move the table another step, a cam 50 on the shaft 51 that is constantly driven, trips a primary valve at 52 that admits air from a line 53, to the other end of the control valve 48 to shift the same and therefore admit fluid pressure from 49 into the other end of the cylinder 38, to move the clutch lever into operative position. In order to quickly stop rotation of the shaft 36, I provide a brake drum 36a thereon (Fig. 7) and a brake band 36b which is tightened against the drum upon operation of the clutch lever 35 by its cylinder 38, so that the mechanism is brought quickly to rest upon throwing out of the clutch.

As shown in the accompanying drawings, two suction stations are provided, at 54 and 55 (Fig. 1), where the glassware is subjected to suctional force for shaping it to formers or molds 56 that are of suitable shapes and are supported in adapters or seats 57. These mold seats carry tubular spindles 58 (Fig. 4) that extend through bearings 59 mounted on the table 16. The spindles 58 near their lower ends are supported in bearings 60 carried by a lower portion of the table 16. Below the bearings 60, pulleys 61 are secured to the spindles, for rotating them in their bearings 59—60 in a manner to be hereinafter described.

At stations 54 and 55, suction heads 62 are provided (Fig. 13), each with an inlet port 63 and containing a plunger or slide valve 64 that has an annular port 65 which communicates with the inlet 63 when the plunger is raised to effect sealed connection at 66 with the spindle 58. Within the spindle, a perforated sleeve 67 is loosely mounted and communicates at its upper end through ports 68 and 69 to the mold cavity.

The slide valves 64 are rotatable in their sleeves 62 and are periodically raised and lowered therein. To this end, each valve has swivel connection with a head 70 that is carried by a piston rod 71 and has connection with a piston 72 in a cylinder 73 to the upper and lower ends of which fluid pressure is alternately admitted and exhausted through ports 74 and 75 to raise and lower the valve 64. Each port 63 and 63a is subjected to suctional force from a venturi 76 (Figs. 8 and 13). The suctional force is created by fluid pressure lines 77 and 77a that are respectively controlled by valves 78 and 79 in sleeves 80 and 81, respectively, the fluid pressure discharging from the lines 77 and 77a, past the valves and into the venturis 76; therefore creating suction at 63 and 63a for the suction heads 62.

The valve 78 has a through port 78a of tapered shape, so that as the valve is slowly lowered in its sleeve 80, the suctional force in line 63 is increased gradually, to avoid sudden suctional shocks on the glassware in the mold. The intensity of the suction created by the venturi is regulated by a hand-operated valve 82.

At the other suction station, a similar venturi device is provided. This device is controlled by the valve 79 that corresponds to the valve 78. A rocking lever 86 is pivotally mounted at 87, and at its ends, is connected to the valves 78 and 79. The triangular port 78a of the valve 78 is graduated in a direction reverse to that of the valve port 88 of the valve 79, so that when the lever 86 is operated in a clockwise direction, for example, both valves will be gradually opened, and contrarywise, when the lever is swung counterclockwise, the valves will both be moved to closed position.

The valves 78 and 79 are operated by cams 90 and 91 respectively. These cams are mounted on the shaft 51 that is driven by worm gearing 92 from a suitable motor. The cam 90 is secured to a sleeve 90a that is in turn keyed at 90b to the shaft 51, and there is sufficient clearance between the cams 90 and 91 and the rollers on the valves 78 and 79 to permit of the valves being rocked by one cam or the other independently of the other cam. A beveled pinion 93 is secured to the shaft 51 and meshes with a pinion 94 that, in turn, meshes with a gear wheel 95 and is fastened to a sleeve 96 that carries the cam 91. The pinion 94 is carried by a segmental worm wheel 97 which is rotatably adjusted by a worm 98 to vary the angularity as between the cams 90 and 91.

The cam 91 lifts the valve 79 to rock the lever 86 in a clockwise direction and thereby create suction at the venturis, the effective cam surface being of such angularity as to give a slow rise and consequently slow valve-opening travel. The cam 90 has a steeper slope and is utilized to rock the lever 86 in a counterclockwise direction and thereby close the valves rapidly. The adjustability at the worm gearing 97—98 is in order to vary the time of opening of the valves relative to the time of closing. In other words, this is a means of regulating the duration of suction in the molds.

Pressure is admitted into the lower end of the cylinder 73 to raise the suction valve 64 to open the port 65 by a pipe 75 (Figs. 4, 5 and 13) that has connection with a control valve 101. The valve is shifted by pressure admitted past a primary valve 102 operated by the stud 46 on the disc 41, each time that the disc makes one revolution. When the valve 101 is shifted to the left, pressure is admitted from a fluid pressure line 103, to the line 75 and the lower end of the cylinder 73 and also to a cylinder 104, that corresponds to the cylinder 73 and controls the other suction valve 64. While the table is stationary at this time, with the suction heads raised at stations 54 and 55, the lever 86 is rocked as above explained, to provide for the required suction through the suction valves 64.

In order to retract or lower the suction heads, the control valve 101 is shifted to the reverse position by the primary valve 52 that directs fluid pressure through a line 106. Thereupon, fluid pressure will be supplied from line 103 through pipes 107 to the upper ends of the cylinders 73 and 104.

At the lifting and ejector stations 109 and 110, the ware is lifted from the molds by raising the perforated sleeve 67. At the station 109, the sleeve 67 is raised only a slight distance to permit of glazing or fire polishing the edge of the ware. This movement is effected by raising and lowering an ejector pin 111 into and out of the spindle 58 and against the bottom of the tube 67. The lower end 111a (Fig. 15) of the pin 111 moves into and out of a slotted head 112a on a piston rod 112 whose piston is contained within the cylinder 113 during rotative movements of the table. Pressure is admitted to the lower end of the cylinder 113 through a pipe 114 (Figs. 2 and 5) past a control valve 115. The valve 115 is actuated by pressure from a primary valve 116 that is operated by a cam 117 keyed at 117a to the shaft 51. This shifting of the control valve 115 through operation of the primary valve 116 results in raising of the piston in the cylinder 113 by pressure from a line 120, to raise the ejector the desired height at station 109 and to fully raise the ejector at the take-out station 110, as hereinafter explained. As shown in Fig. 5, the stems of the valves 116 and 118 are independently operable by their respective cams so that adjustment of one cam will not necessarily affect the operation of the valve at the other cam.

Figure 2:
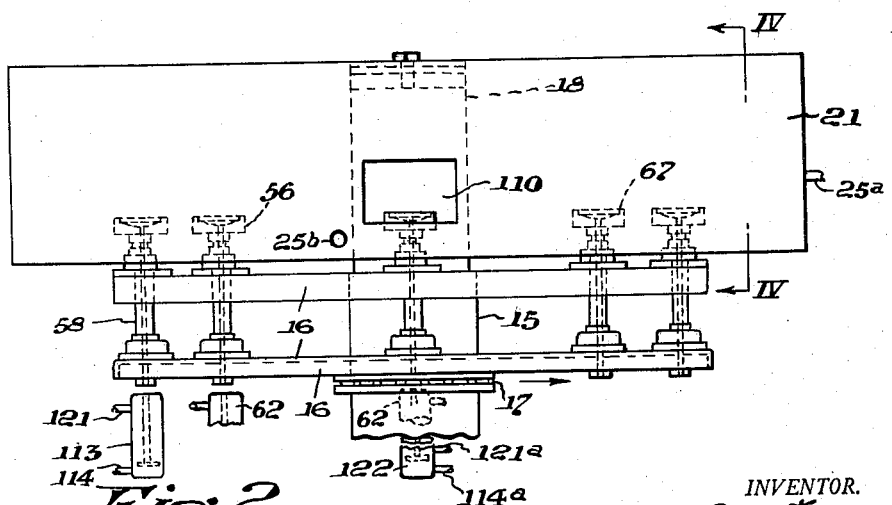
Fig. 2 is an elevational view of the structure of Fig. 1 with the lower part of the mechanism omitted.

Lowering of the ejectors is effected by a primary valve 118 operated by a cam 119 on the shaft 51. In this case, air will be directed from the inlet 120 to a line 121 that leads to the upper ends of both cylinders 113 and 122. The ejector cylinder 122 corresponds to and is operated in the same manner as the ejecting apparatus at station 109, except that the ejector plunger of the cylinder 122 will be raised higher to permit convenient removal of the ware from the mold at the take-out station 110. As shown in Fig. 2, pipes 121a and 114a direct fluid pressure into the upper and lower ends of the cylinder 122. The ports at valve 101 are so arranged that when the piston-like valve member is moved toward the left, exhaust will be had through a port 101a while an exhaust port 101b permits exhaust when pressure is admitted to the other end of the valve body 101. Similarly at valve 115, the exhaust will be alternately through ports 115a and 115b.

In order that the work pieces can be rotated while being heated, and particularly while being subjected to the burner flames, the pulleys 61 on the lower ends of the spindles 58 are driven by a belt 124 (Figs. 4 and 16) which is, in turn, driven by a pulley 125 on a shaft 126 driven by worm gearing 130 and a belt 131 from a motor 132. The belt loop is engaged by and rotates the pulleys 61, except at the ejector and take-out station 110, where the pulleys 61 are temporarily out of engagement with the belt. As shown in Figs. 4 and 16, a belt-tensioning pulley 128 is mounted on an adjustable bearing bracket 129.

A beveled gear wheel 133 (Fig. 8) is keyed at 117a to the shaft 51 and meshes with a pinion 134 carried by a segmental worm gear 135. The pinion 134 meshes with a beveled gear wheel 136 that is adjustable by a worm 137. Turning of the worm 137 effects rotative adjustment of the cam 119 on the shaft 51 and hence varies the timing of the operation of the valve 118 that controls the lowering of the plungers. In other words, at one adjustment, the plungers and particularly the plunger at the take-out station will be raised sooner and thus kept in a raised position for a longer period when required. This will sometimes be necessary, as when more time is required to remove a finished piece of ware than is needed to place another piece of ware on the former.

As shown more clearly in Fig. 1, there is what may be termed an idle station between the station 109 and the take-out station 110. This arrangement permits of some cooling of the ware during pause at this intermediate station, so that it is not subject to deformation while removing it at station 110. An air jet 25b serves this purpose.

In order to lock the table, while it is not being moved by the Geneva pinion 42, a camming surface 140 (Figs. 3 and 7) is provided on the edge of the disc 41 for about one-third of its circumference. A cam follower or slide 141 is engaged by the camming rib 140, so that the slide is moved outwardly against the pressure of a spring 142 which urges a locking bar 143 that is connected with the follower 141 into engagement with a stop member 144 that is bolted to the table 16 as shown more clearly in Fig. 7a.

Detailed forms of some molds and an adapter are shown in Figs. 20 to 23, it being understood, of course, that molds of various other contours can be employed, including those of rectangular instead of circular form.

The molds, as shown in Figs. 20 and 21, are adapted to receive glass plates or other thermoplastic sheets 146 of circular contour. Each mold is provided with an annular bead 147 upon which the glass initially rests. Where lamp shades or bowls of decorative contours are desired, the mold will have a series of annular depressions 148, 149, 150 and 151. The glass, when heated and subjected to suction within the mold, may be drawn down only partly as shown by dash lines in Fig. 20, or into any or all of the additional depressions 149–151 and 151a. Ports or passageways 152 afford communication between the depressions and the conduits 153 that, in turn, communicate with the space 154 in the mold body as do also passageways 155 that connect with a central passageway 156 at the mold bottom. The base flange 157 of the mold fits within the annular recess 158 of the adapter. The suction provided through the perforated sleeve 67 and its ports 68—69 is transmitted through the space 154 to the mold.

The work pieces or glass plates are placed upon the molds at the loading and take-out station 110 and the table 16 is rotated step-by-step as heretofore explained. The molds, when they pass the station, will have been cooled to perhaps 800° F. to 900° F. for glass, so that as soon as a glass plate is placed thereon, it is heated on its underside to the temperature of the mold which would be somewhat below softening temperature. As the glass is advanced past the burners, it will be heated on its upper surface, and by the time it reaches the first forming station 54, it will be softened enough to be partially drawn down into the mold by the suction, the suctional force for final shaping being greater at the next station 55. At the station 109, the glass will be elevated slightly for softening of the edge or glazing or fire polishing, and then lowered as explained above. During pause at the station intermediate this station 109 and the take-out station 110, the glass having been lowered into the mold, will have opportunity to cool and will regain its shape in the mold. This slight reshaping may be necessary because of change in shape at station 109, particularly at the softened edge of the glass. At the take-out station 110, the glass will be lifted sufficiently far from the mold to permit removal thereof and will be of such temperature that it will not be deformed through handling.

In the case of the thinner plates of glass comparable to double-thickness window glass, there will preferably be a differential in temperature as between the upper and lower surfaces of the glass at the suction stations. For example, with the lower face of the glass plate at between 800° F. and 900° F., the upper surface will be heated to 1300° F. upwardly. For thicker glass, the temperature of the upper glass surface will usually be somewhat in excess of 1300° F.

In any case, the glass is not heated to such a high temperature that it will sag appreciably by the force of gravity. This has the advantage of better control of shaping to various contours and producing variations in wall thickness of the completed article as hereinafter explained, and also prevents irregularities or unevennesses in the lower surface of the glass when brought into contact with the mold wall, and particularly in the case of molds that are not highly polished and, of course, also where suction openings in the bottom or side walls of the molds that would sometimes produce an imprint on soft glass.

It is usually undesirable to suddenly apply full suctional force to the glass at the first forming station, because it would be distorted by wrinkling or warping. It is for this reason that the tapered valve ports of Figs. 9 and 10 are used. The relatively adjustable cams 90—91 on the timer 51 provide for duration of suctional force at the forming stations as heretofore stated.

An important feature of my invention is the rotation of the molds during the application of flame and suctional force in order to effect uniformity of heating and shaping of the glass. The heating of the glass particularly at the forming stations is controlled in various ways, according to the shape of the finished article desired. For example, if it is desired to start bending it at an extreme edge of the glass, a more intense heat is applied to the edge of the glass than to the mid zone thereof. At the same time, a slight vacuum is applied at the first forming station to bend the glass to a predetermined distance into the mold. At the next station, the heat may be applied more greatly to the middle of the glass than to the edge, to permit of further drawing down of the mid part of the glass without further disturbing the edges of the glass. On the other hand, the mid area of the glass can be first softened to a greater extent than the marginal edge of the glass, in which case the mid portion of the glass may be drawn down to shape without stretching or changing the edges of the glass, and therefore maintaining accurate diameter and edge thickness.

Heating of the edge of the glass to make it quite soft permits of thickening such edge to bead-like form. This can conveniently be done at the lifting station 109 when the glass is lifted slightly out of the mold. Application of the burner flames to the edge of the glass while rotating the mold produces a nice uniform bead.

In Fig. 22, I illustrate a mold for bending an article such as a dinner plate or tray 160 from a flat blank 161. The mold 162 has a raised central portion 163 with an annular rib 164 thereon, so that the glass 161 will initially have only this circular line contact with the mold. A slight clearance is provided between the peripheral edge of the glass and the mold, but this clearance is not sufficient to prevent the subjecting of the undersurface of the glass to the necessary suction. Suctional force is applied from a central passage 165 in the mold, through ports 166; an annular space 167, and a clearance space at 168, to that portion of the plate located outwardly of the rib 164. The glass is thereby drawn from its dotted line position to the shape of the mold, as shown by the numeral 160.

In Fig. 23, I show a mold for making necked ware such as lighting bowls, without unduly thinning the neck or the portion of the reduced diameter. In this case, a glass plate 168 is placed upon a rib 169 of a mold 170. The central and lower portion 171 of the mold, for forming the neck of the article, is initially raised into contact with the glass plate, as shown by dash lines. The central portion of the plate 168 is then heated to soften it. Suction is provided through a pipe or stem 172 to draw the central portion of the glass into contact with the wall of the mold section 171. Thereupon, the stem 172 and the mold section 171 is lowered to its full line seated position, leaving the preshaped central portion of the glass in suspended condition. Thereupon, the outer portions of the plate are heated to a higher temperature and suction will be applied from the pipe 172 to the entire undersurface of the sheet, to bring it into completed shape within the mold cavity. This avoids excessive thinning of the wall in the lower portion of the article.

Ordinarily, the molds will become heated to about 900° F. during their movement around the furnace chamber. However, while passing the cooling and take-out stations, they will become cooled somewhat, so that they will preferably be at about 800° F. when the glass plates are placed thereon at the take-out and charging station. This is advantageous, because the glass, which is introduced at room temperature, will quickly become heated to the temperature of the mold, and the stresses produced therein will be uniform. The upper side of the glass is thereafter gradually heated to softening temperature, and when the glass is bent to shape, its undersurface will not be as soft as to become marred by small imperfections in the mold surface. This is of advantave as compared to the older methods, because the previous practice has been to enter the mold and the glass sheet into the furnace at room temperature, with the result that the mold will become heated to approximately the same temperature as the glass and the undersurface of the glass will therefore be so greatly softened as to be marred by even minute imperfections in the mold surface. Furthermore, too high temperature of the mold would cause the glass to adhere to it.

It is important in the use of my apparatus to control mold temperatures within a proper range, not only for the purpose of producing uniformity of product, but also to maintain a good speed of production. To this end, the molds will not become heated to such a degree that the glass will stick to them and also they will be prevented from becoming too cold, with consequent slowing up of the production rate. For example, the highest temperature of the molds will be about 900° F., and at the cooling station and during the time required for taking out the ware and charging, the molds will become cooled to about 800° F.

While the invention is here shown as employed in connection with apparatus of the rotatable-table type, it will be understood that various features of the invention would be applicable to heating and suction devices, and the mold travel being in other than circular arrangement.

Also, it will be understood that more than two suction stations may be employed, and that there can be heating burners 25b disposed between the suction stations 54—55 (Fig. 1) as for example when forming ware by the use of molds such as those shown in Figs. 20 to 23, where some reheating of portions of the glass blank may be required between successive suctional operations.

I claim as my invention:

1. Glass shaping apparatus for bending glass blanks to contours of molds, that comprises a heating and softening furnace, a rotatable mold carrier in the furnace that is movable in a horizontal plane in proximity to successively-located loading, suction, glazing and takeout stations distributed peripherally of said carrier, bearings peripherally spaced on said carrier in sequentially confronting relationship with the loading, suction, glazing and take-out stations, hollow spindles extending through said bearings and said carrier and having mold seats formed on their upper ends, molds supported by said mold seats, said molds being adapted to receive glass blanks and having passageways of communication between the cavities of said molds and the hollow of said spindles, sleeves carried within said spindles and vertically reciprocable therewithin, said sleeves having perforations to provide communication therethrough, means for rotating the carrier step-by-step past said stations, a suction head at the suction station, a source of suction for the head, cam-controlled means actuated by the driving mechanism for periodically raising and lowering the head during pauses in carrier movement, the head when raised being in engagement with the lower ends of the spindles of successive molds, means operating in timed relation to the raising movement of the spindles for creating suction through the head and the spindles, to the mold cavities, to thereby cause the heated glass blanks to assume the contours of the mold cavities, means at said glazing station for rotating the spindles and their molds about their individual axes, and burners above the molds for heating the glass blanks during said rotation.

2. Glass shaping apparatus as recited in claim 1, wherein there are a plurality of suction stations, whereby the glass may be partly shaped in the mold at one station and the shaping thereof completed by another suction head at a succeeding station.

3. Apparatus as recited in claim 1, further comprising a plunger at said glazing station, means for mounting said plunger in vertical alignment with the center of said spindles during the sequential movement thereof through said glazing station, means for vertically reciprocating said plunger, timing means for actuating said reciprocating means in synchronism with said step-by-step carrier rotating means to raise the spindles while the carrier is at rest, and a glazing burner superjacent said carrier at said glazing station for treating the edge of the article.

References Cited in the file of this patent
UNITED STATES PATENTS

| Number | Name | Date |
| --- | --- | --- |
| 682,571 | Sage | Sept. 10, 1901 |
| 787,438 | Cutler | Apr. 18, 1905 |
| 1,236,937 | Hough | Aug. 14, 1917 |
| 1,489,729 | Aucremanne | Apr. 8, 1924 |
| 1,813,105 | Wetmore | July 7, 1931 |
| 2,057,763 | Boyles et al. | Oct. 20, 1936 |
| 2,377,849 | Binkert et al. | June 12, 1945 |
| 2,493,439 | Braund | Jan. 3, 1950 |
| 2,553,135 | Eisler | May 15, 1951 |
| 2,573,429 | Geier | Oct. 30, 1951 |
| 2,649,659 | Kahle | Aug. 25, 1953 |
| 2,682,730 | Rossen | July 6, 1954 |